United States Patent
Snider

(10) Patent No.: US 10,501,008 B2
(45) Date of Patent: Dec. 10, 2019

(54) REAR LIFTGATE WINDOW ASSEMBLY WITH INTEGRATED LIGHTING

(71) Applicant: MAGNA MIRRORS OF AMERICA, INC., Holland, MI (US)

(72) Inventor: Darin J. Snider, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 296 days.

(21) Appl. No.: 15/428,448

(22) Filed: Feb. 9, 2017

(65) Prior Publication Data

US 2017/0246984 A1  Aug. 31, 2017

Related U.S. Application Data

(60) Provisional application No. 62/300,229, filed on Feb. 26, 2016.

(51) Int. Cl.
| | |
|---|---|
| *B60Q 1/26* | (2006.01) |
| *B60J 1/18* | (2006.01) |
| *H05B 3/84* | (2006.01) |
| *B60Q 1/32* | (2006.01) |
| *F21S 45/10* | (2018.01) |

(Continued)

(52) U.S. Cl.
CPC ............ *B60Q 1/268* (2013.01); *B60J 1/1876* (2013.01); *B60J 1/1884* (2013.01); *B60Q 1/323* (2013.01); *F21S 45/10* (2018.01); *H05B 3/84* (2013.01); *B60Q 1/0088* (2013.01); *B60Q 3/30* (2017.02); *F21V 23/0457* (2013.01);

(Continued)

(58) Field of Classification Search
CPC ....... B60J 1/1876; B60J 1/1884; B60Q 1/268; B60Q 1/323
See application file for complete search history.

(56) References Cited

U.S. PATENT DOCUMENTS

| | | | | |
|---|---|---|---|---|
| 4,449,167 | A * | 5/1984 | Cohen .................... | B60Q 1/302 |
| | | | | 362/269 |
| 4,488,141 | A * | 12/1984 | Ohlenforst ............. | B60Q 1/268 |
| | | | | 362/541 |

(Continued)

FOREIGN PATENT DOCUMENTS

DE         9114246 U1    2/1992

OTHER PUBLICATIONS

Sanchez, Dan, "Lighting Up Cap and Tonneau Sales," Trucking Times.com, Wiesner Media 2015.

*Primary Examiner* — Anh T Mai
*Assistant Examiner* — Zachary J Snyder
(74) *Attorney, Agent, or Firm* — Honigman LLP

(57) ABSTRACT

A rear liftgate window assembly for a vehicle includes a glass window panel configured to be pivotally mounted at a rear portion of a vehicle so as to be pivotable between a closed position and an opened position. A lighting device is disposed at an inner surface of the glass window panel and includes (i) at least one light source adhesively attached at the inner surface of the glass window panel, (ii) electrical connectors disposed at the inner surface of the glass window panel, and (iii) electrically conductive traces established at the inner surface of the glass window panel between the light sources and the electrical connectors. The electrical connectors are configured to electrically connect to a power source of the vehicle when the rear liftgate window assembly is mounted at the vehicle.

24 Claims, 15 Drawing Sheets

(51) Int. Cl.
  *F21V 23/04* (2006.01)
  *F21Y 115/10* (2016.01)
  *B60Q 1/00* (2006.01)
  *B60Q 3/30* (2017.01)

(52) U.S. Cl.
  CPC ....... *F21V 23/0492* (2013.01); *F21Y 2115/10* (2016.08); *H05B 2203/011* (2013.01); *H05B 2203/013* (2013.01)

(56) References Cited

U.S. PATENT DOCUMENTS

| | | | |
|---|---|---|---|
| 4,645,970 A | 2/1987 | Murphy | |
| 4,758,931 A | 7/1988 | Gabaldon | |
| 4,896,136 A | 1/1990 | Hotovy | |
| 4,920,698 A | 5/1990 | Friese et al. | |
| 4,995,195 A | 2/1991 | Olberding et al. | |
| 5,016,145 A | 5/1991 | Singleton | |
| 5,050,051 A | 9/1991 | Machida et al. | |
| 5,146,712 A | 9/1992 | Hlavaty | |
| 5,211,466 A | 5/1993 | Jarocki et al. | |
| 5,400,225 A | 3/1995 | Currie | |
| 5,531,046 A | 7/1996 | Kollar et al. | |
| 5,551,197 A | 9/1996 | Repp et al. | |
| 5,572,376 A | 11/1996 | Pace | |
| 5,799,444 A | 9/1998 | Freimark et al. | |
| 5,831,523 A | 11/1998 | Lange | |
| 5,839,231 A | 11/1998 | Gebhart et al. | |
| 5,853,895 A | 12/1998 | Lewno | |
| 5,996,284 A | 12/1999 | Freimark et al. | |
| 6,019,418 A * | 2/2000 | Emerling | B60J 5/0416 296/146.7 |
| 6,026,611 A | 2/2000 | Ralston et al. | |
| 6,086,230 A | 7/2000 | Wooldridge et al. | |
| 6,119,401 A | 9/2000 | Lin et al. | |
| 6,536,930 B1 | 3/2003 | Hirmer | |
| 6,691,464 B2 | 2/2004 | Nestell et al. | |
| 6,955,009 B2 | 10/2005 | Rasmussen | |
| 7,003,916 B2 | 2/2006 | Nestell et al. | |
| 7,036,965 B2 | 5/2006 | Dalton, Jr. et al. | |
| 7,048,400 B2 | 5/2006 | Murasko et al. | |
| 7,073,293 B2 | 7/2006 | Galer | |
| 7,172,322 B2 | 2/2007 | Pommeret et al. | |
| 7,184,190 B2 | 2/2007 | McCabe et al. | |
| 7,255,451 B2 | 8/2007 | McCabe et al. | |
| 7,274,501 B2 | 9/2007 | McCabe et al. | |
| 7,347,608 B2 | 3/2008 | Emde | |
| 7,568,823 B2 * | 8/2009 | Bauer | B60Q 1/0023 362/503 |
| 7,575,349 B2 | 8/2009 | Bucher et al. | |
| 7,642,908 B2 | 1/2010 | Mertens | |
| 8,047,691 B2 | 11/2011 | Leese et al. | |
| 8,151,519 B2 | 4/2012 | Bello et al. | |
| 8,382,350 B2 | 2/2013 | Gold | |
| 8,402,695 B2 | 3/2013 | Smith et al. | |
| 8,408,773 B2 | 4/2013 | Judge | |
| 8,881,458 B2 | 11/2014 | Snider et al. | |
| 8,882,318 B2 | 11/2014 | Pfeil et al. | |
| 8,915,018 B2 | 12/2014 | Snider | |
| 8,938,914 B2 | 1/2015 | Hulst et al. | |
| 9,006,751 B2 * | 4/2015 | Kleo | B32B 17/10036 257/82 |
| 9,896,026 B2 | 2/2018 | Snider | |
| 2002/0152686 A1 | 10/2002 | Whitehead | |
| 2003/0213179 A1 | 11/2003 | Galer | |
| 2004/0020131 A1 | 2/2004 | Galer et al. | |
| 2006/0092658 A1 | 5/2006 | Scholz | |
| 2006/0107600 A1 | 5/2006 | Nestell et al. | |
| 2007/0217213 A1 | 9/2007 | Chang | |
| 2008/0127563 A1 | 6/2008 | Tooker | |
| 2008/0155902 A1 | 7/2008 | Kaiser | |
| 2010/0149826 A1 | 6/2010 | Leese et al. | |
| 2014/0047772 A1 | 2/2014 | Hulst | |
| 2015/0197194 A1 * | 7/2015 | Salter | B60Q 1/2669 362/510 |
| 2015/0224856 A1 | 8/2015 | Snider et al. | |
| 2015/0314672 A1 | 11/2015 | Lahnala | |
| 2016/0114731 A1 | 4/2016 | Habibi | |
| 2016/0200241 A1 | 7/2016 | Snider | |
| 2018/0170245 A1 | 6/2018 | Snider | |

* cited by examiner

REAR LIFTGATE WINDOW ASSEMBLY WITH INTEGRATED LIGHTING

CROSS REFERENCE TO RELATED APPLICATION

The present application claims the filing benefits of U.S. provisional application Ser. No. 62/300,229, filed Feb. 26, 2016, which is hereby incorporated herein by reference in its entirety.

FIELD OF THE INVENTION

The present invention relates to a rear window assembly for a vehicle and, more particularly, a rear liftgate window assembly for a SUV or crossover vehicle or station wagon or the like.

BACKGROUND OF THE INVENTION

It is known to provide a rear liftgate window assembly for a rear opening of a vehicle. Such liftgate window assemblies are pivotable between a closed or generally vertical state and an opened or generally horizontal state. Often, the upper glass or rear window portion of a rear door or liftgate of a vehicle can be pivoted separate from the lower rear panel portion of the vehicle.

SUMMARY OF THE INVENTION

The present invention provides a rear liftgate window assembly that includes a lighting device having one or more light sources disposed at an inner surface of the glass window panel of the rear window assembly so as to provide a rear liftgate glass window assembly with lighting that is operable to illuminate an area below the liftgate and at the rear of the vehicle when the liftgate is open. The light sources may comprise white light-emitting (or other color) light sources for the illumination function or the like. The lighting device is electrically connected to a wiring harness or circuitry or user input of the vehicle when the window assembly is installed or mounted at the vehicle. The light sources are bonded at the interior or in-cabin surface of the liftgate glass window panel and thus are integrated with the glass window panel, such that the liftgate window provides lighting when the liftgate panel is open, without the need for trim or frame elements at and around the glass window panel.

These and other objects, advantages, purposes and features of the present invention will become apparent upon review of the following specification in conjunction with the drawings.

DESCRIPTION OF THE PREFERRED EMBODIMENTS

Figure 1:
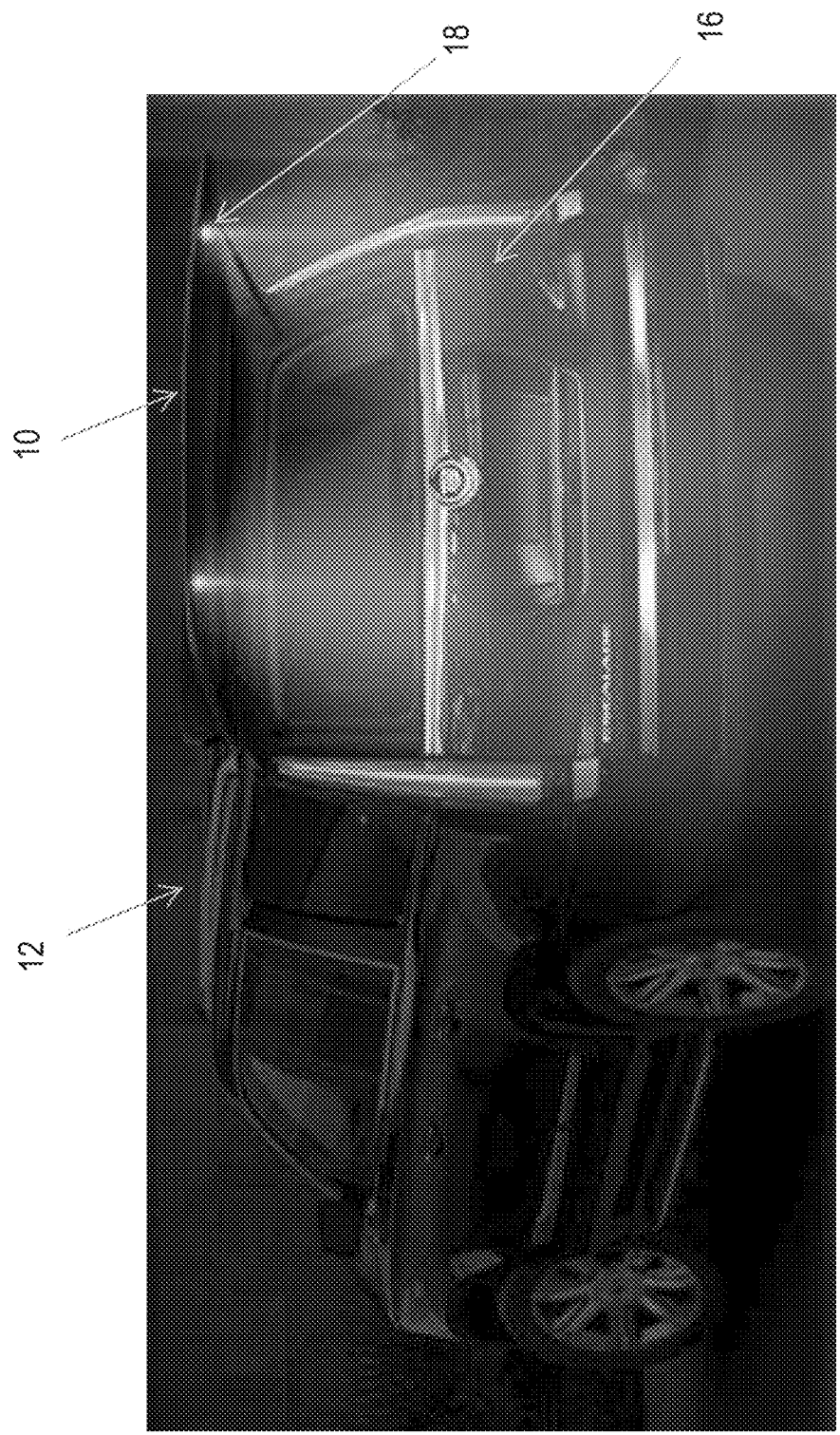
FIG. 1 is a rear perspective view of a SUV having a rear liftgate window assembly in accordance with the present invention.
Figure 2:
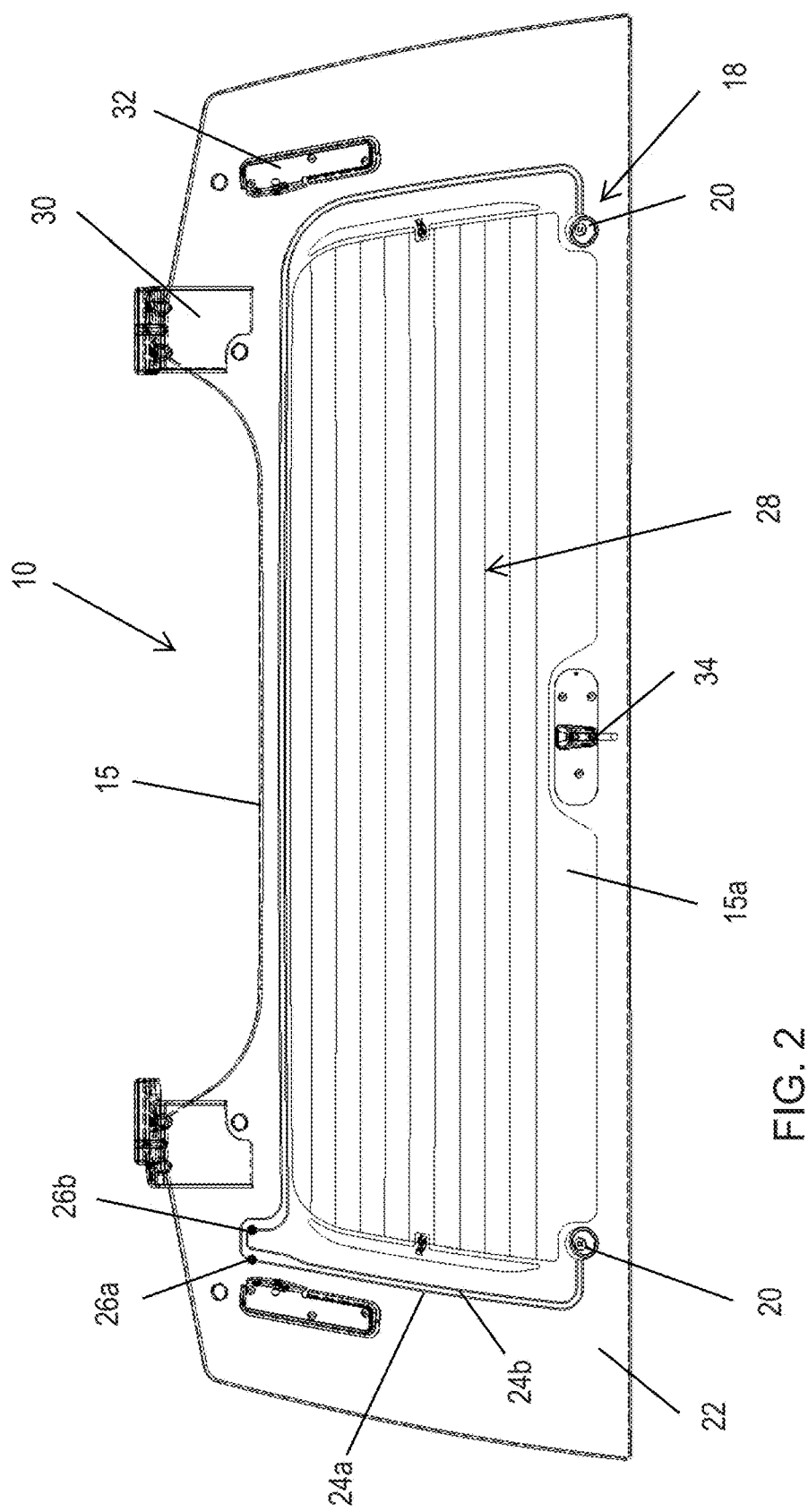
FIG. 2 is an interior elevation of the liftgate window assembly of the present invention.
Figure 3:
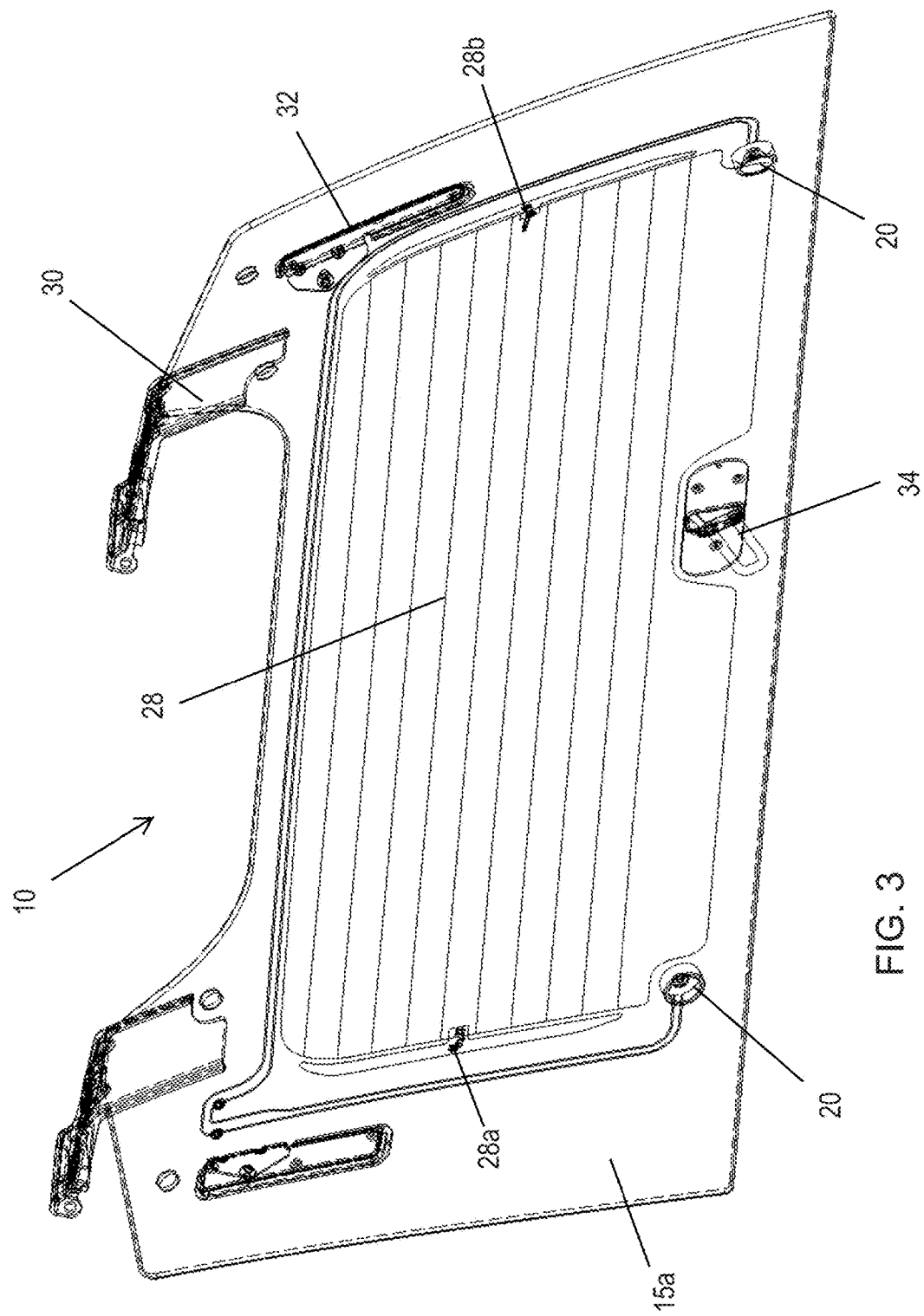
FIGS. 3-6 are interior perspective views of the liftgate window assembly of FIG. 2.
Figure 4:
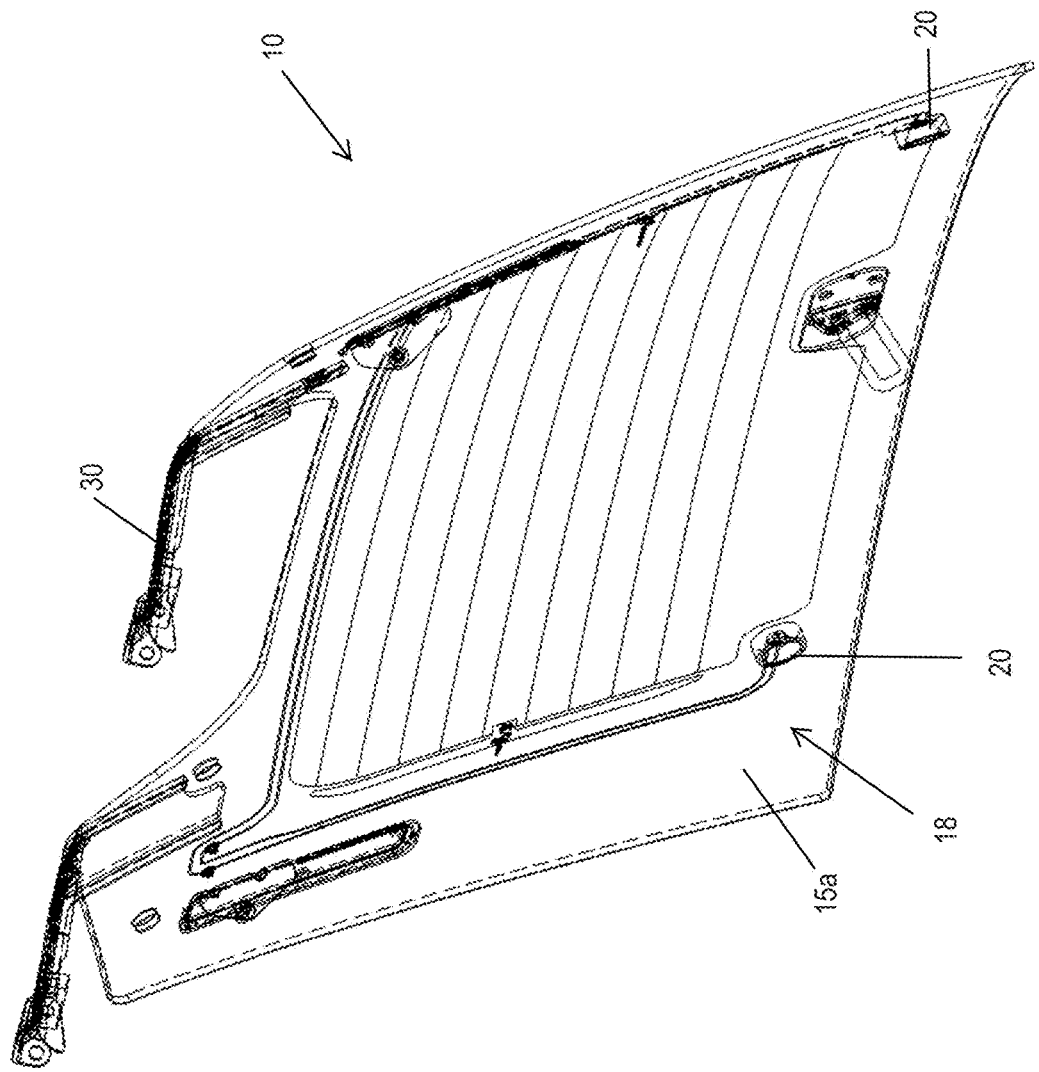
Figure 5:
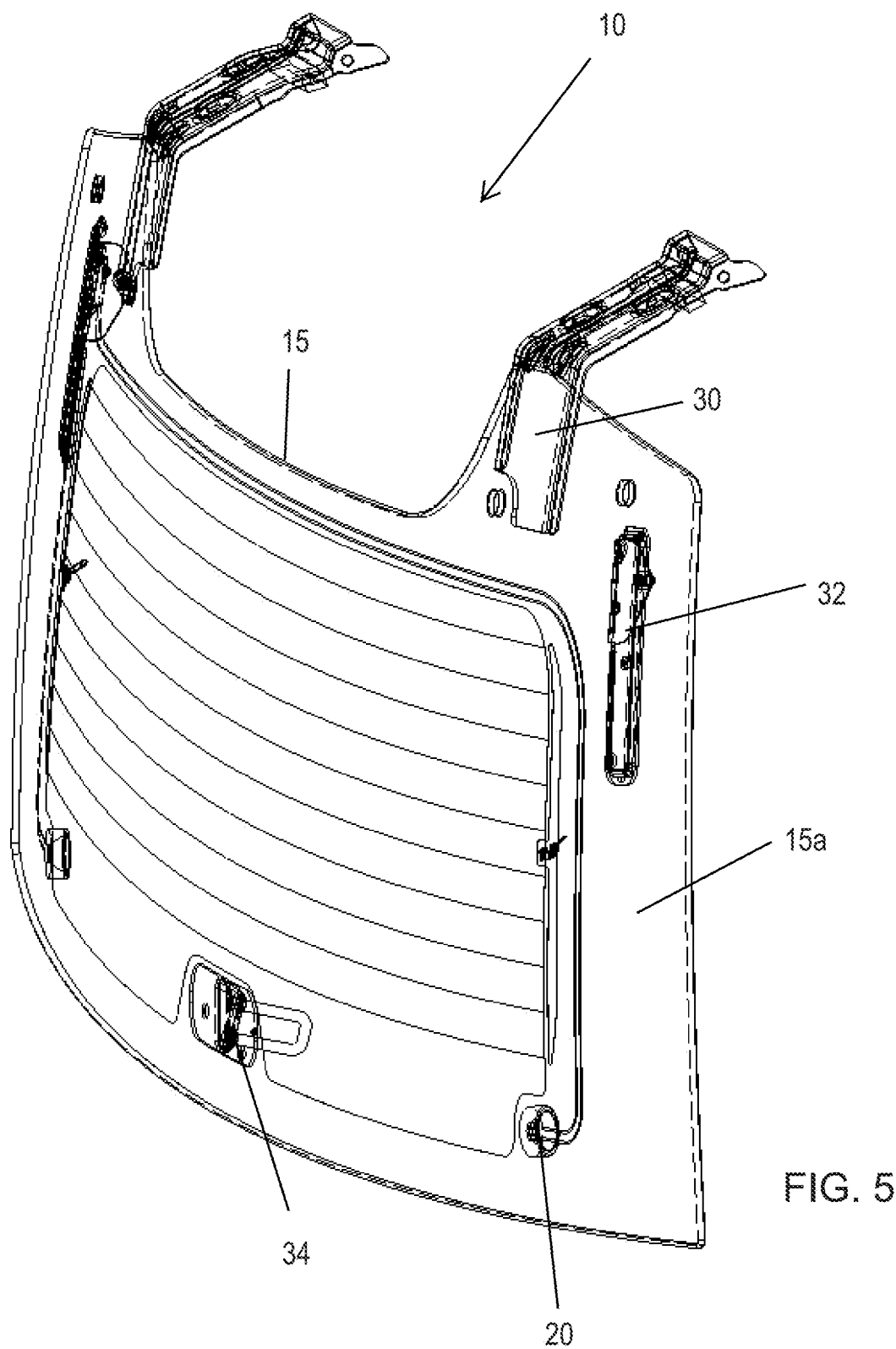
Figure 6:
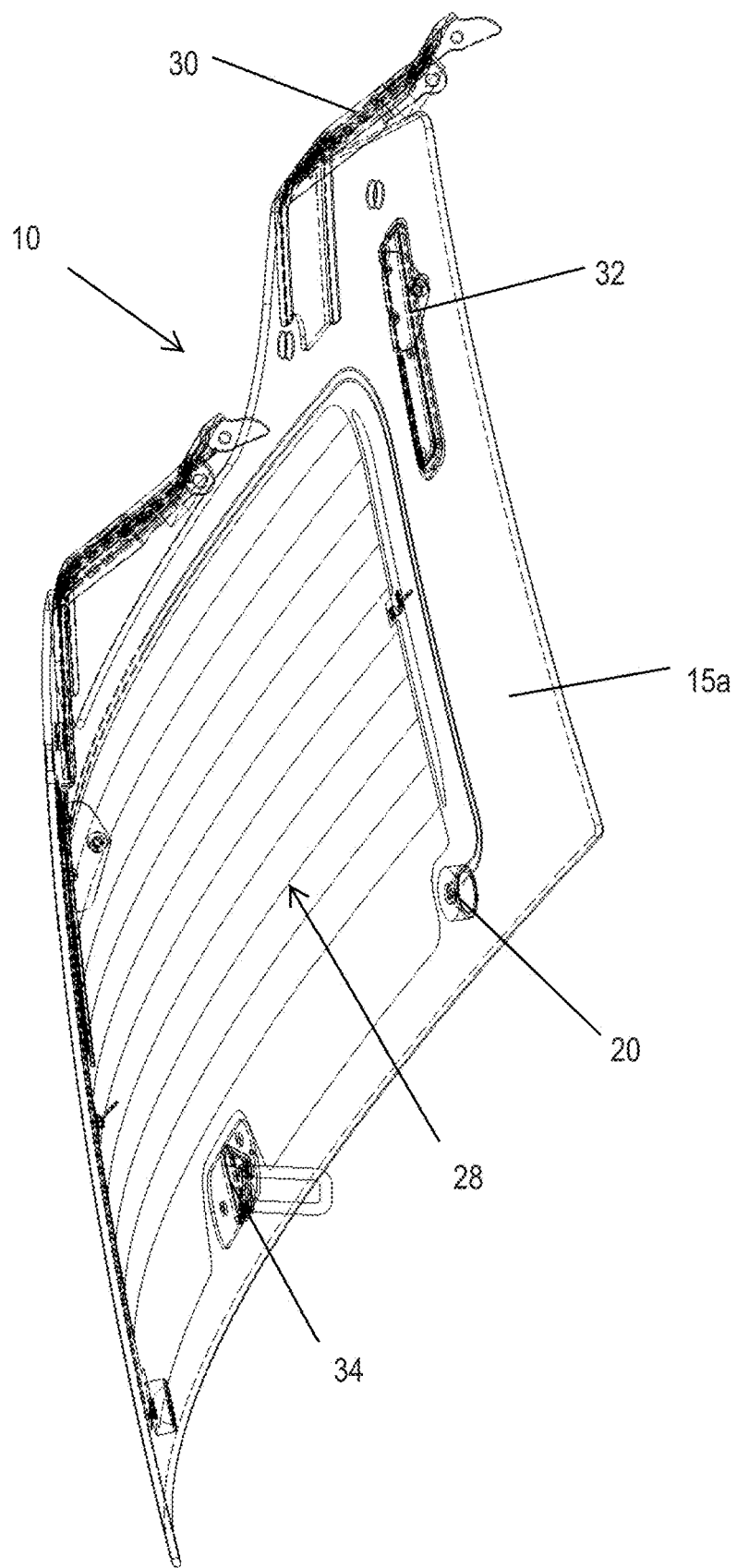
Figure 7:
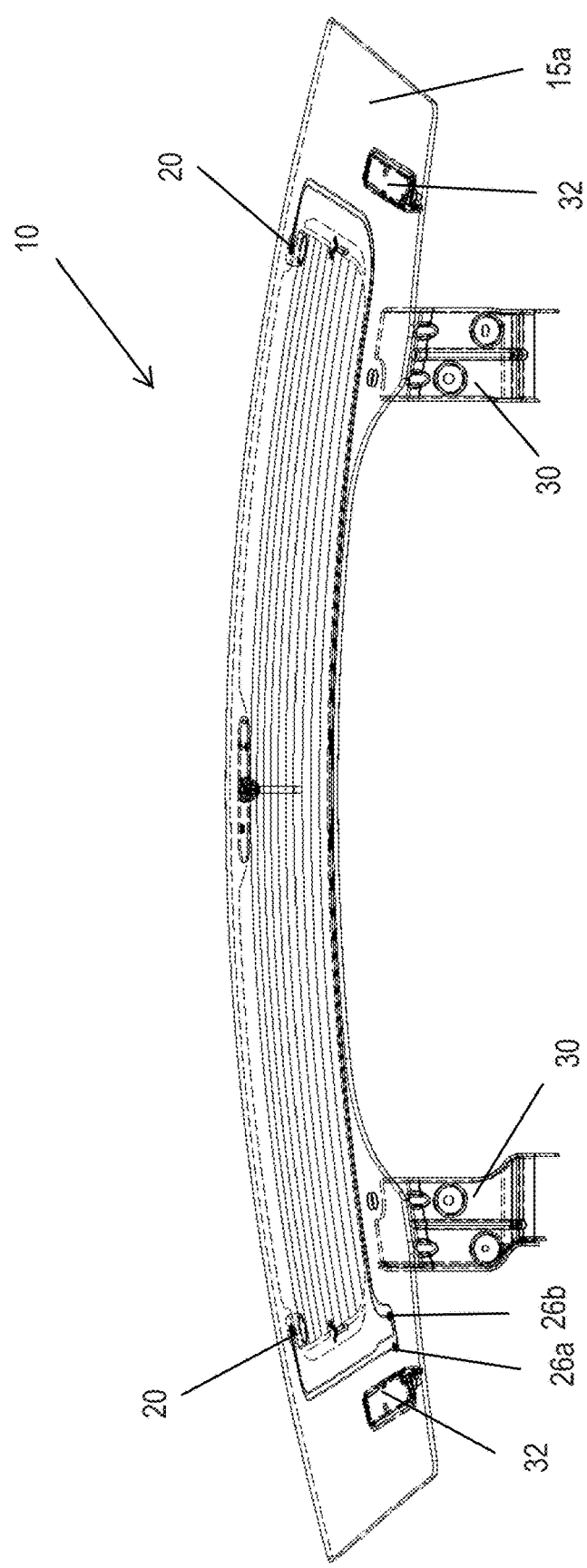
FIG. 7 is a top perspective view of the liftgate window assembly of FIG. 2.
Figure 8:
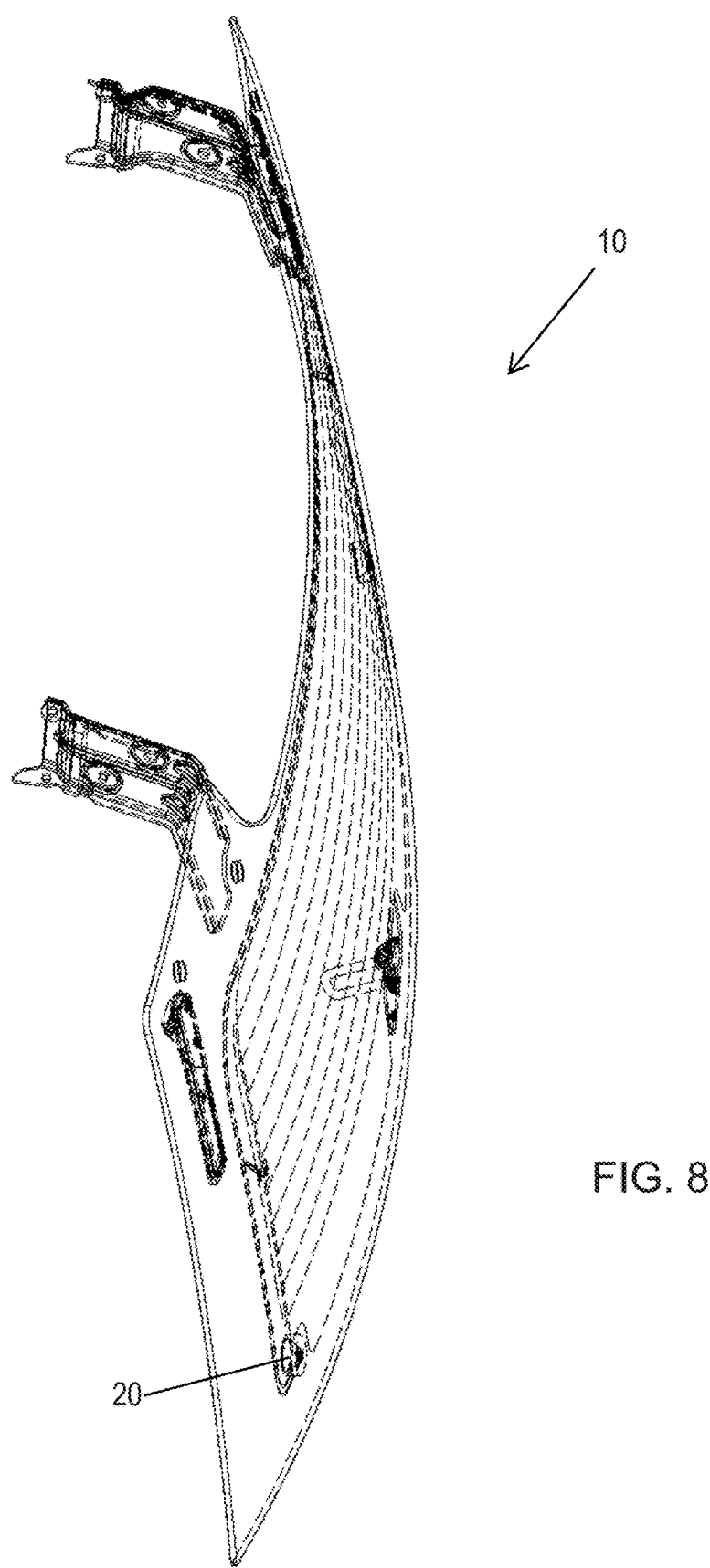
FIGS. 8 and 9 are exterior perspective view of the liftgate window assembly of FIG. 2.
Figure 9:
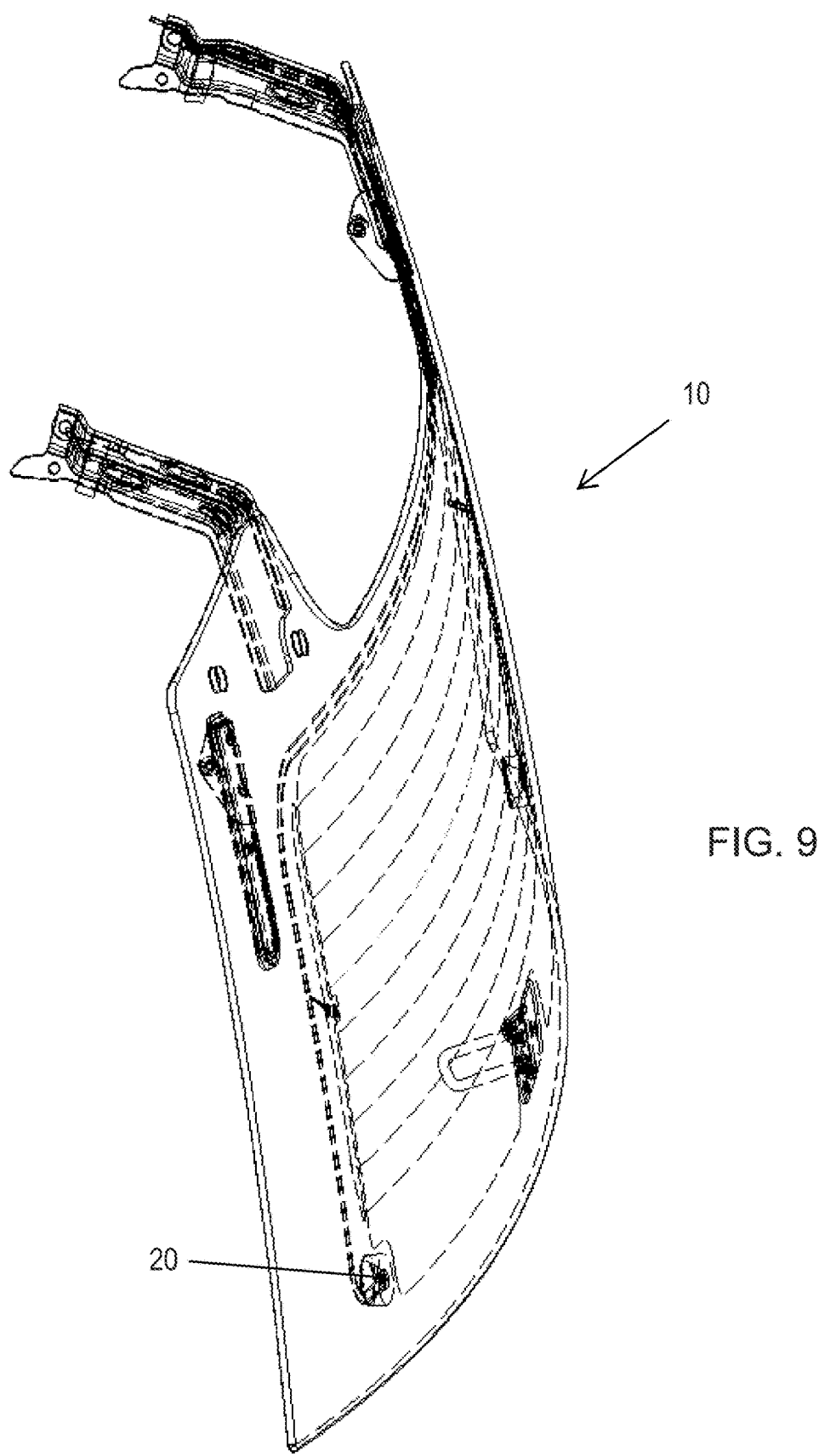

Referring now to the drawings and the illustrative embodiments depicted therein, a rear liftgate window assembly 10 of a vehicle 12 (such as a SUV or the like) includes a window panel liftgate assembly 14 that is pivotally mounted at the vehicle and is pivotable between an opened position (FIG. 1), where the window panel is pivoted or lifted upward to open a rear portion of the vehicle, and a closed position, where the window panel is pivoted or lowered to close the rear portion of the vehicle, and where the window panel may cooperate with a fixed or movable lower rear panel or door or liftgate 16 of the vehicle to close the rear portion of the vehicle. The window assembly 10 includes a lighting system having a lighting device 18 disposed at the interior surface of the glass window panel 15. The lighting device 18 (such as two or more spaced apart light emitting diodes or the like), when activated and when the liftgate window assembly 14 is opened, emits light generally downwardly to illuminate the area to the rear of the vehicle, so as to assist a person in loading and unloading the vehicle in low lighting or nighttime conditions.

In the illustrated embodiment, the liftgate window assembly 14 comprises a separately openable window panel assembly, where the liftgate window may be opened separately from the lower rear panel or door 16 of the vehicle. Optionally, the liftgate window assembly 14 may open and close with the rear panel or door 16, while remaining within the spirit and scope of the present invention.

Figure 10:
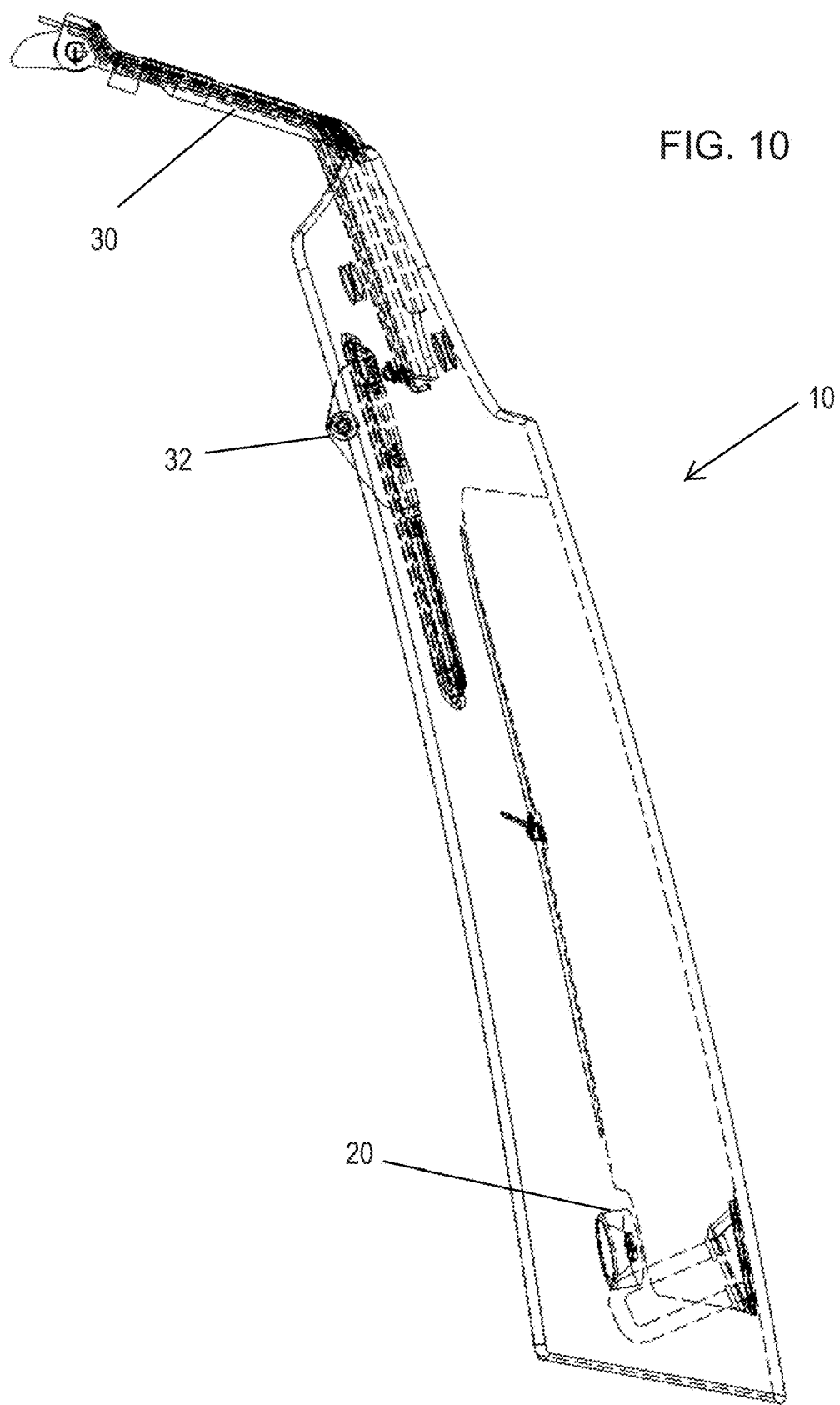
FIG. 10 is a side elevation of the liftgate window assembly of FIG. 2.
Figure 11:
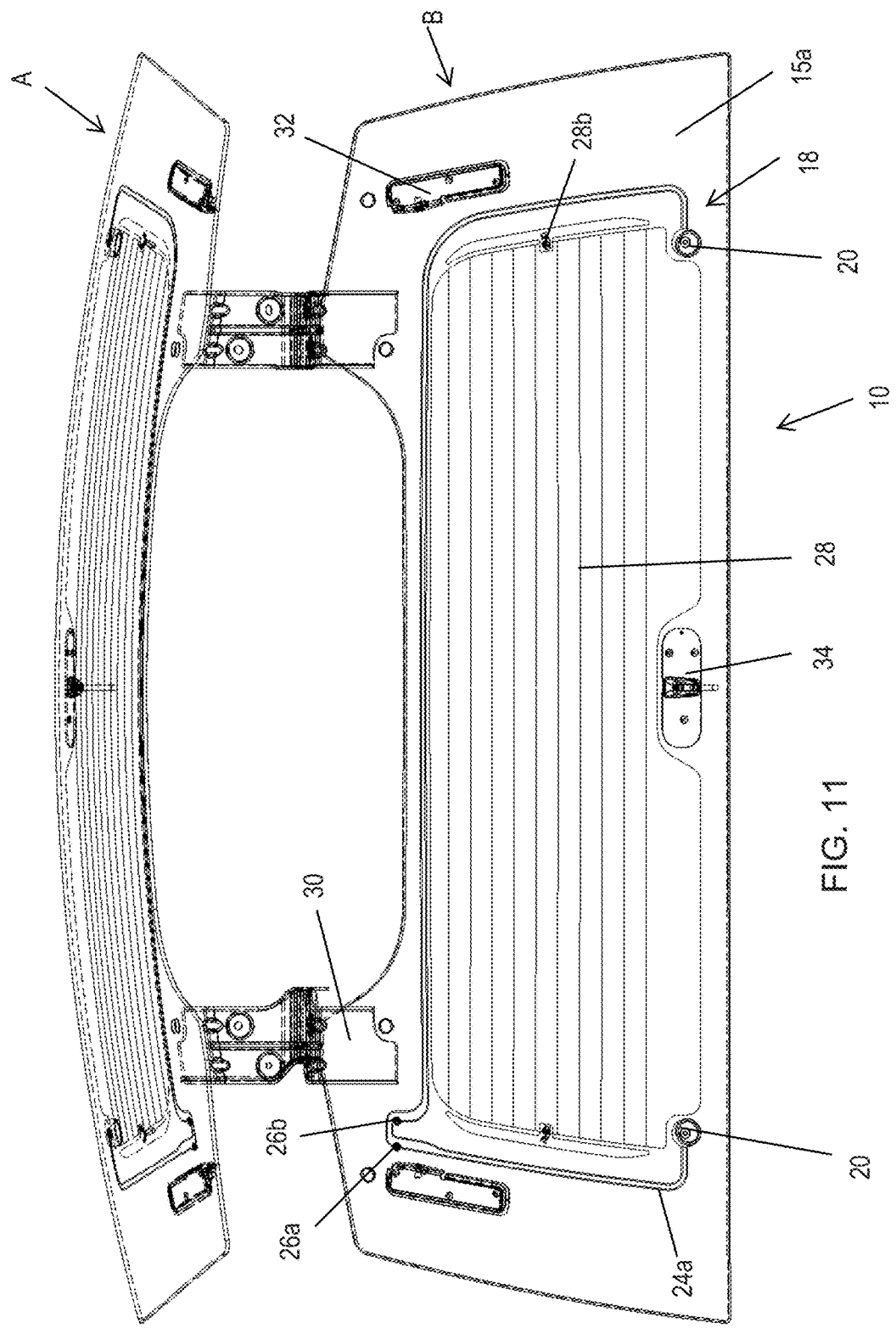
FIGS. 11-15 are perspective views of the liftgate window assembly of FIG. 2, showing the liftgate window panel in a closed state and an opened state.
Figure 12:
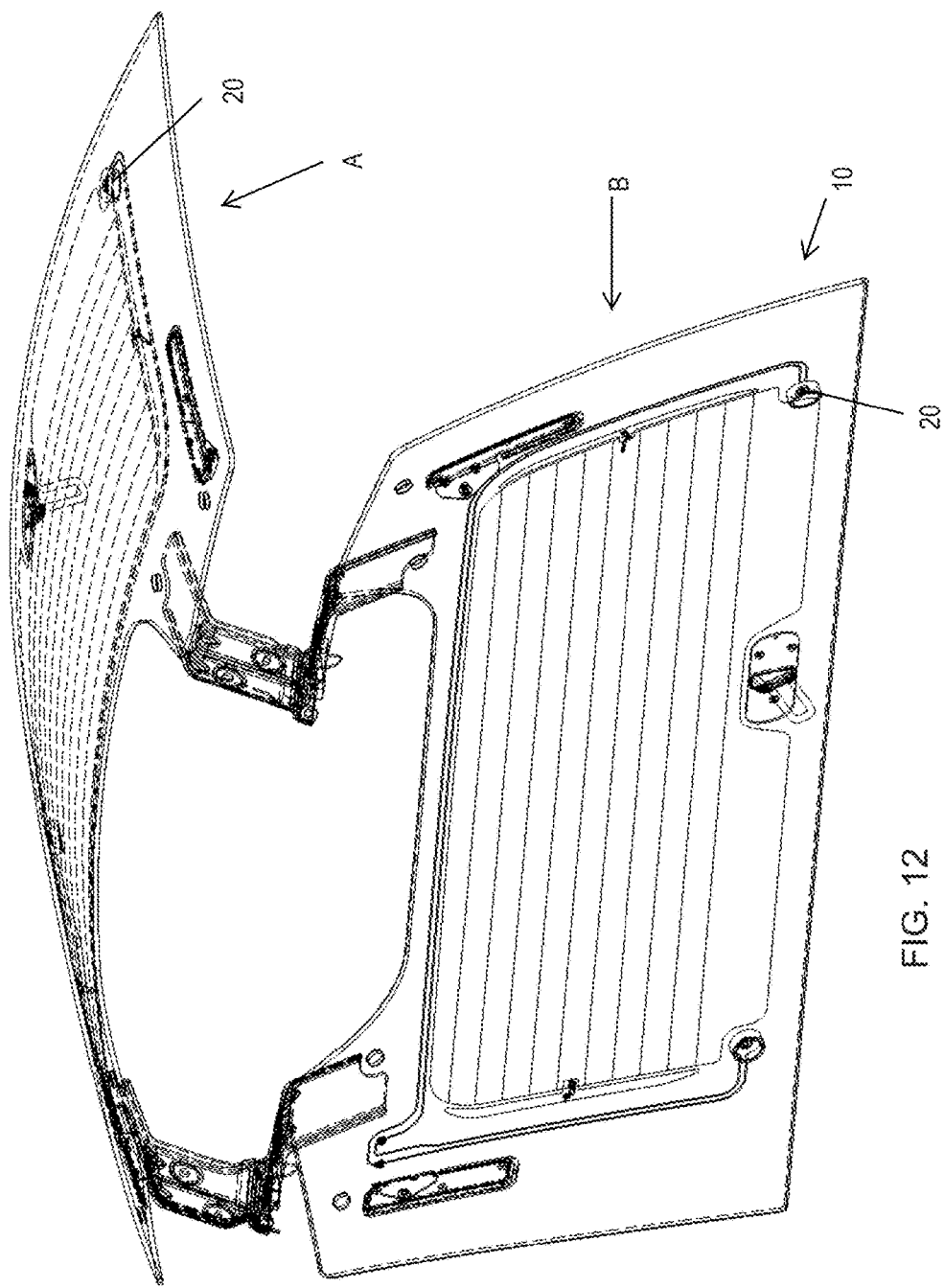
Figure 13:
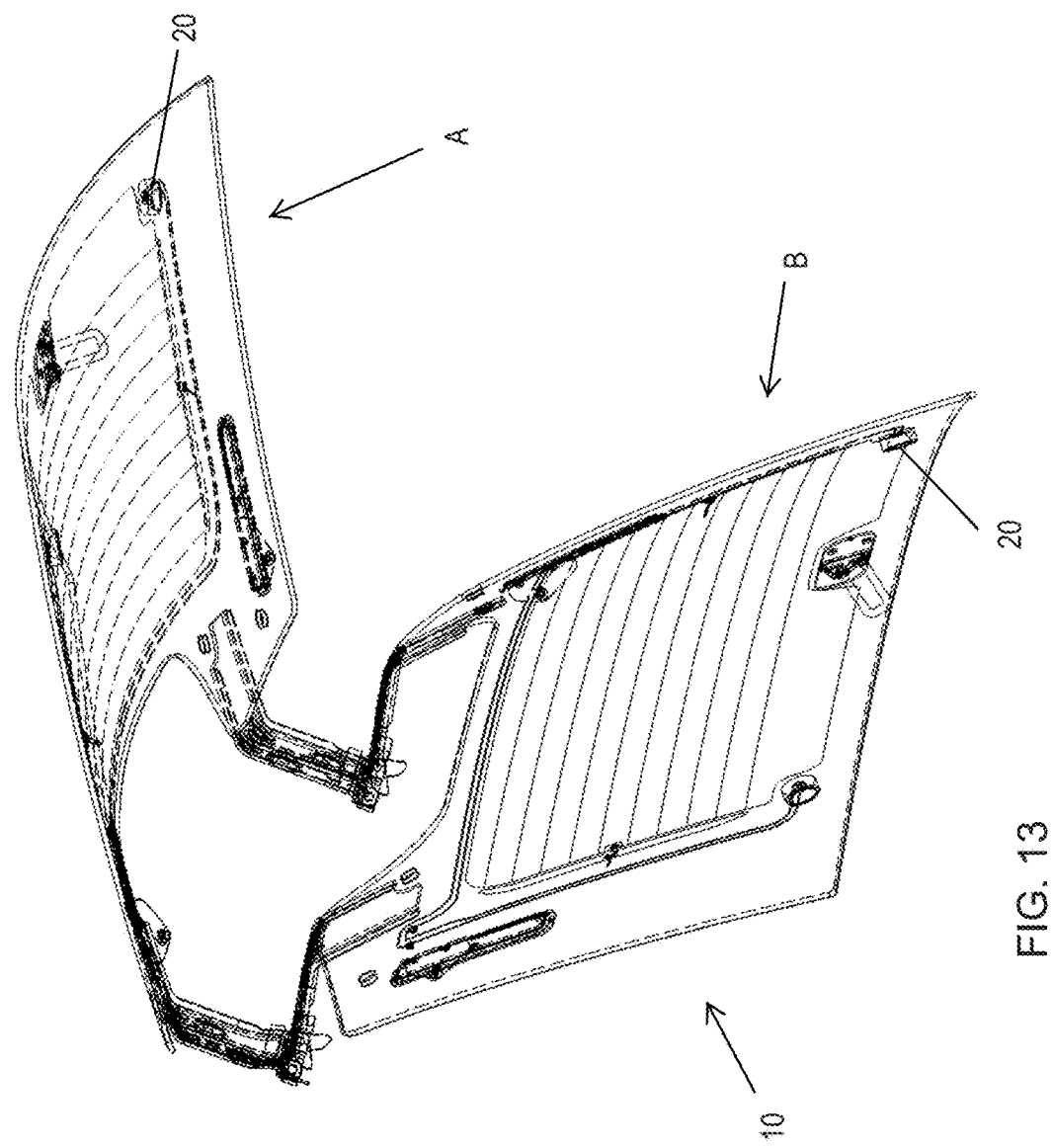
Figure 14:
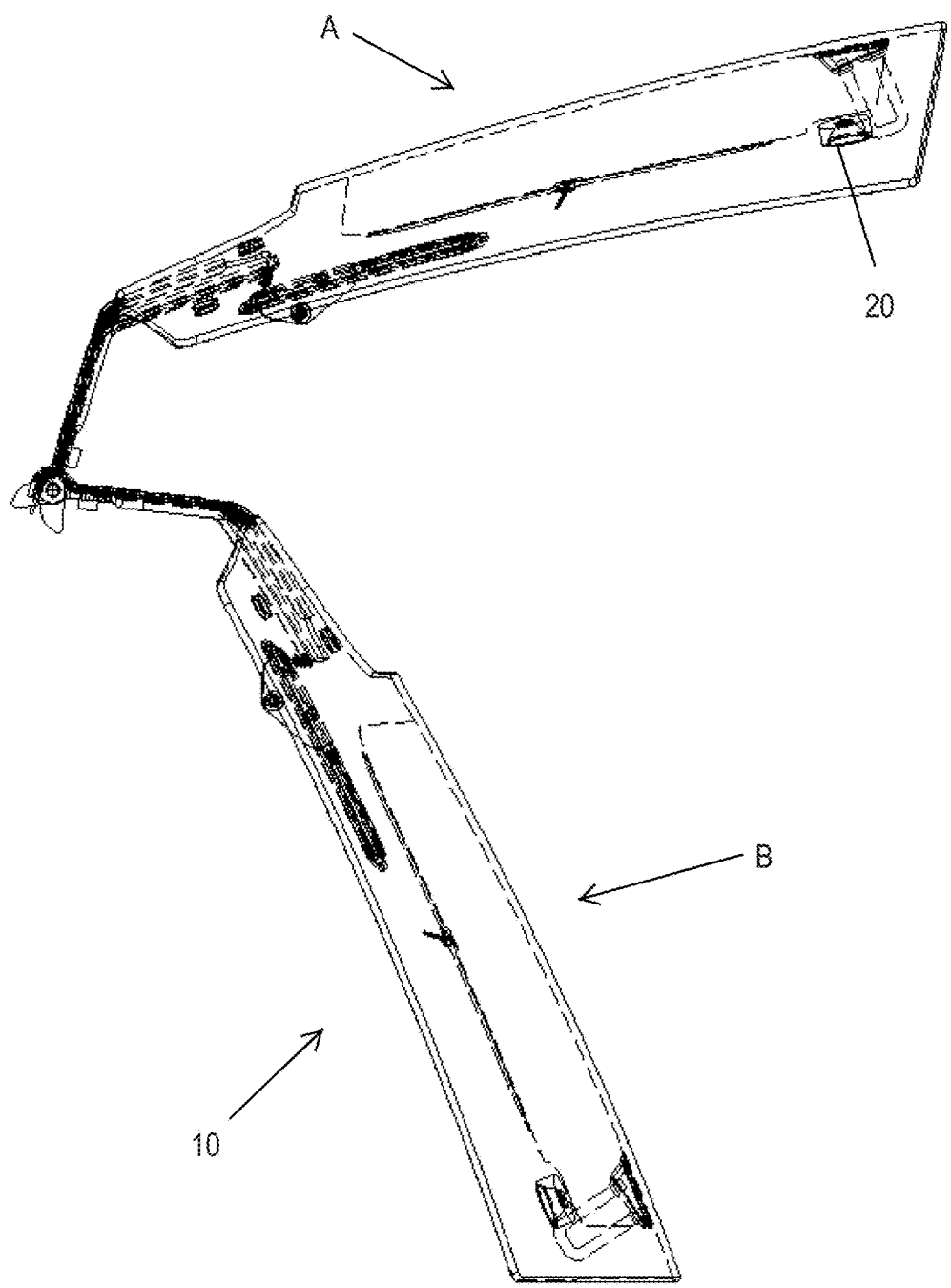
Figure 15:
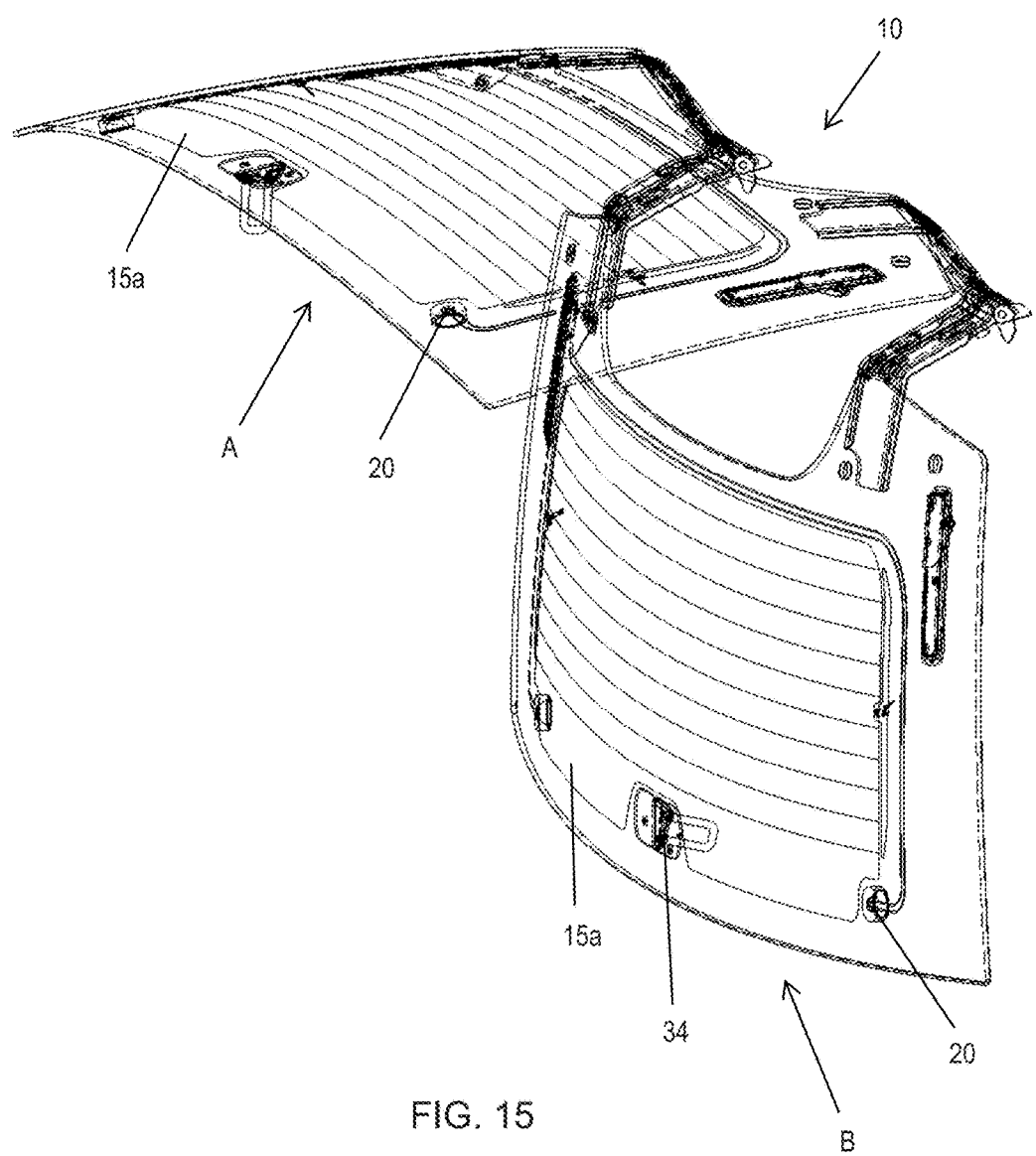

As shown in FIGS. 2-15, lighting device 18 comprises a pair of light sources 20 disposed at the inner surface 15a of the window panel 15. Each of the light sources may comprise any suitable light source, such as a small or generally flat or low profile white light-emitting light source, such as a light emitting diode (LED) or the like. The light source may be disposed in a low profile housing to protect the light source and to guide or direct or reflect illumination emitted by the light source, when activated, in the desired direction. For example, the housing may have a conical-shaped reflective surface with an LED disposed at or near the glass surface and with the conical-shaped reflective surface expanding outwardly from the LED (see FIG. 10). The light sources may comprise any suitable light source, and may utilize aspects of the light sources described in U.S. Publication No. U.S.-2016-0200241, which is hereby incorporated herein by reference in its entirety. The light sources or housings are adhesively attached or bonded at the inner surface of the glass window panel (such as directly to the inner glass surface or to a dark or opaque or non-light-transmitting coating or frit layer 22 established at the inner glass surface of the window panel). The light sources are bonded at the inner surface after the conductive traces 24a, 24b are established at the glass window panel, whereby electrical connection of terminals of the light source is made to the respective conductive traces when the light source is adhered or bonded at the inner surface of the window panel.

The light sources 20 are disposed at a lower portion of the window panel 15 and at each lower side corner region of the window panel, such that, when the liftgate window assembly is opened, the light sources are spaced from the vehicle and emit light generally downward to illuminate the area rearward of the vehicle (such as shown in FIG. 1). Optionally, the light source or sources may be disposed elsewhere at the inner surface of the window panel, and/or the lighting device may comprise a single light source or a strip of light sources, which may be disposed along a lower center region of the window panel, depending on the particular application of the liftgate window assembly. The light sources are preferably disposed at a region of the window pane where the dark or opaque or non-light-transmitting coating or frit layer 22 is disposed, such that the light sources are not viewable to a person viewing the rear window panel from exterior of the vehicle when the window panel is closed.

The lighting device 18 includes conductive traces or busbars 24a, 24b disposed at the window panel 15 (and preferably also disposed at or behind the dark or opaque or non-light-transmitting coating or frit layer 22). The conductive traces 24a, 24b are disposed between respective electrical terminals or connectors at each light source and respective electrical terminals or connectors 26a, 26b at the window panel 15. The electrical terminals or connectors 26a, 26b may comprise any suitable connector attached or soldered or the like at the window panel and configured to connect to a wiring harness of the vehicle when the window assembly is installed at a vehicle, with one of the terminals or connectors 26a electrically connecting to a positive feed of the vehicle and the other terminal or connector 26b electrically connecting to a negative or ground wire of the vehicle. Electrical power is provided to the light sources 20 via the conductive traces 24a, 24b, which are spaced apart at the window panel or otherwise electrically isolated from one another (and electrically isolated from contact at the window panel by a person, such as via a non-electrically conductive coating or layer or encapsulation or the like disposed over the conductive traces). Clearly, other means for electrically connecting the light sources to a wiring harness or circuitry of the vehicle may be implemented while remaining within the spirit and scope of the present invention. For example, the light source and conductive traces may utilize aspects of the systems described in U.S. Pat. Nos. 7,274,501; 7,184,190 and/or 7,255,451, which are hereby incorporated herein by reference in their entireties. The conductive traces are established so as to be sufficiently electrically conductive to provide power to the light sources (such as to provide low power to one or more low-power LEDs or the like).

The conductive traces thus provide electrical power from an upper region of the window panel where the terminals or connectors 26a, 26b may be located (so as to electrically connect to a vehicle wiring harness at or near the hinge location of the window panel) to the lower region of the window panel where the light sources 20 are located, without requiring additional wiring or wire harnesses or the like. Thus, the rear liftgate window assembly of the present invention provides a lighting device at the glass window panel without requiring wiring and thus trim or frame elements along the perimeter of the window panel. Thus, the rear liftgate window assembly of the present invention provides a frameless glass liftgate window that is openable and closable at the rear of a vehicle and that provides illumination of the area rearward of the vehicle when the liftgate window is opened. The glass window panel of the frameless glass liftgate window assembly has a perimeter edge that circumscribes and spans between the inner and outer surface of the window panel is exposed and viewable by a person viewing the frameless glass liftgate window assembly when the frameless glass liftgate window assembly is in its opened position (in other words, there are no trim elements or encapsulations at the periphery of the window panel of the frameless glass liftgate window assembly).

Optionally, and such as shown in the illustrated embodiment, the window panel 15 may also include a heater grid 28, which comprises a plurality of conductive traces disposed at the glass window panel between electrical terminals or connectors 28a, 28b, whereby electrical power is provided to the heater grid traces (and associated busbars) when the connectors 28a, 28b are electrically connected to vehicle wiring and powered. The electrically conductive heater grid or heating element established at the window panel (such as at or on an interior surface of the window panel) is electrically conductively connected to (or is otherwise in electrical conductive continuity with) a power source of the vehicle and may be powered (such as responsive to a user actuatable input or switch or button of the vehicle or responsive to a sensor or accessory of the vehicle) to heat or defrost or defog the window panel. The heater grid comprises a plurality of electrically conductive traces that may extend across the respective window panels between respective busbars to provide enhanced and more uniform heating and defrosting/defogging of the window panel.

Optionally, the busbars of the heater grid may extend along the window panel (such as along regions where the opaque or non-light-transmitting layer is disposed) and along one or both of the conductive traces 24a, 24b of the lighting device, such that the heater grid and the lighting devices may have conductive traces that terminate at a common connecting area. One or more electrical connectors may be disposed at the common connecting area and electrically connected to the respective conductive traces and busbars, such that one or more electrical connectors of a vehicle wire harness or harnesses may be electrically connected to the electrical connectors at the window panel when the rear liftgate window assembly is mounted at the vehicle to provide electrical power to the heater grid and to the lighting device via the respective electrical connections at the electrical connecting region. Such a configuration eases installation of the liftgate window assembly and eases electrical connection to both the lighting device and the heater grid. Such a configuration also provides for commonly located electrical connections at a convenient upper region of the liftgate window assembly where the electrical connections may not be readily viewable to a person viewing the liftgate window assembly when the liftgate window is opened or closed.

Therefore, the rear liftgate window assembly of the present invention provides a lighting device at the glass window panel for illuminating the area rearward of the vehicle when the liftgate window is opened. The rear liftgate window assembly provides such lighting without requiring wiring and thus trim or frame elements along the perimeter of the window panel. Thus, the rear liftgate window assembly of the present invention provides a frameless glass liftgate window that is openable and closable at the rear of a vehicle and that provides illumination of the area rearward of the vehicle when the liftgate window is opened. As shown in FIGS. 2-15, the hinge supports 30, strut supports 32 (that may hold or attach an end of a gas-assist spring or strut at the window panel) and latch element 34 may be bonded to the inner surface of the glass window panel (such as at regions where the opaque frit layer is disposed), such that the liftgate window assembly 14 does not require any frame portions or trim elements or the like. The lighting devices and/or hinge supports and/or strut supports and/or latch elements may be adhesively bonded at the glass window panel by utilizing aspects of the systems described in U.S. Pat. Nos. 5,853,895 and/or 5,551,197, which are hereby incorporated herein by reference in their entireties The lighting device of the liftgate window assembly of the present invention provides illumination at the rear of the vehicle when the liftgate window assembly is opened (see position A in FIGS. 11-15), with the lighting devices being deactivated when the liftgate window assembly is closed (see position B in FIGS. 11-15). Optionally, the lighting device may be actuated responsive to a user input, such as a button or switch at the rear of the vehicle or at the dashboard of the vehicle or the like. Optionally, for applications where the lighting device is activated via such a user input, the lighting device may be actuated when the liftgate is closed to provide interior lighting at the rear compartment of the vehicle. Optionally, the lighting device may be actuated responsive to a sensor that senses when the rear liftgate window assembly is raised or opened. Optionally, for a powered liftgate application (where the liftgate may be opened and closed via actuation of a user input), the lighting device may be automatically actuated when the user input is actuated to open the liftgate assembly. Optionally, the lighting assembly may be actuated responsive to opening of the liftgate window and responsive to an ambient light sensor (whereby the lighting device is actuated when ambient lighting at the vehicle is below a threshold level, but may not be activated when ambient lighting is high, such as during daytime). The ambient sensor and/or the position sensor may be overridden by a user input (whereby a user may actuate the lighting device regardless of the lighting conditions and regardless of the position or status of the liftgate window).

Changes and modifications to the specifically described embodiments may be carried out without departing from the principles of the present invention, which is intended to be limited only by the scope of the appended claims, as interpreted according to the principles of patent law.

The invention claimed is:

1. A rear liftgate window assembly for a vehicle, said rear liftgate window assembly comprising:

a glass window panel;

a pair of hinge elements disposed at an upper region of said glass window panel, wherein said hinge elements are configured to pivotally mount said glass window panel at a rear portion of a vehicle so that said glass window panel is pivotable between a closed position, where said glass window panel is disposed at a rear opening of the vehicle, and an opened position, where said glass window panel is raised to a raised orientation away from the rear opening of the vehicle;

a latch element disposed at a lower region of said glass window panel, wherein said latch element is configured to engage a latching element of the vehicle to retain said glass window panel in the closed position;

a lighting device disposed at an inner surface of said glass window panel, said lighting device comprising (i) at least one light source adhesively attached at said inner surface of said glass window panel, (ii) electrical connectors affixed at said inner surface of said glass window panel, and (iii) electrically conductive traces established at said inner surface of said glass window panel between respective terminals of said light sources and respective ones of said electrical connectors;

wherein each of said electrically conductive traces is established and affixed at and along said inner surface of said glass window panel between a respective electrical connector of said electrical connectors and a respective terminal of said at least one light source;

wherein said at least one light source is disposed at the lower region of said glass window panel;

wherein said electrical connectors are disposed at the upper region of said glass window panel;

wherein said electrical connectors are configured to electrically connect to a power source of the vehicle when said rear liftgate window assembly is mounted at the vehicle; and wherein, with said rear liftgate window assembly mounted at the vehicle and with said electrical connectors electrically connected to the power source of the vehicle and when said glass window panel is in its opened position, said at least one light source is operable to emit light to illuminate a ground area rearward of the vehicle.

2. The rear liftgate window assembly of claim 1, wherein said at least one light source comprises a light source disposed at or near each corner of said glass window panel at the lower region of said glass window panel.

3. The rear liftgate window assembly of claim 2, wherein said electrical connectors comprise a positive electrical connector and a negative electrical connector, and wherein said electrically conductive traces connect each of said positive and negative electrical connectors to respective terminals of each of said light sources.

4. The rear liftgate window assembly of claim 1, wherein said at least one light source comprises at least one light emitting diode.

5. The rear liftgate window assembly of claim 1, wherein said at least one light source is disposed at a housing adhesively attached at said inner surface of said glass window panel.

6. The rear liftgate window assembly of claim 1, wherein, with said glass window panel pivotally mounted at the rear portion of the vehicle and with said electrical connectors electrically connected to the power source of the vehicle, said at least one light source is activated responsive to opening of said glass window panel.

7. The rear liftgate window assembly of claim 6, wherein said at least one light source is deactivated as said glass window panel is moved toward its closed position.

8. The rear liftgate window assembly of claim 1, wherein the upper region of said glass window panel is configured to pivotally mount at the rear portion of the vehicle via said hinge elements such that said glass window panel pivots about a horizontal pivot axis at the rear portion of the vehicle.

9. The rear liftgate window assembly of claim 8, wherein said at least one light source comprises a light source disposed at or near each corner of said glass window panel at the lower region of said glass window panel opposite said upper region of said glass window panel.

10. The rear liftgate window assembly of claim 8, wherein, with said glass window panel pivotally mounted at the rear portion of the vehicle and with said electrical connectors electrically connected to the power source of the vehicle, and responsive to said glass window panel pivoting of said glass window panel toward its opened position, said light sources are activated.

11. The rear liftgate window assembly of claim 1, wherein said glass window panel comprises a transparent glass window panel with a portion of said glass window panel having an opaque non-light-transmitting layer thereat.

12. The rear liftgate window assembly of claim 11, wherein said at least one light source is adhesively attached at said opaque non-light-transmitting layer.

13. The rear liftgate window assembly of claim 11, wherein said electrical connectors are affixed at said opaque non-light-transmitting layer.

14. The rear liftgate window assembly of claim 11, wherein said electrically conductive traces are established at said opaque non-light-transmitting layer.

15. The rear liftgate window assembly of claim 1, wherein said glass window panel comprises a perimeter edge that circumscribes said inner surface and spans between said inner surface and an outer surface of said glass window panel, and wherein said perimeter edge is exposed and viewable when said glass window panel is pivotally mounted at the rear portion of the vehicle and in the opened position.

16. A rear liftgate window assembly for a vehicle, said rear liftgate window assembly comprising:

a glass window panel comprising an upper region and a lower region and an inner surface, and wherein said glass window panel has an opaque non-light-transmitting layer disposed at a portion thereof;

hinge elements disposed at said upper region of said glass window panel and configured to pivotally attach at an upper rear portion of a vehicle to mount said rear liftgate window assembly at the vehicle such that said glass window panel is pivotable between a closed position, where said glass window panel is disposed at a rear opening of the vehicle, and an opened position, where said glass window panel is raised to a raised orientation rearward from the upper rear portion of the vehicle;

a lighting device disposed at said inner surface of said glass window panel, said lighting device comprising (i) light sources adhesively attached at said inner surface of said glass window panel, (ii) electrical connectors affixed at said inner surface of said glass window panel at or near said upper region of said glass window panel, and (iii) electrically conductive traces established at and along said inner surface of said glass window panel between said light sources and said electrical connectors;

wherein said light sources comprise a first light source adhesively attached at a first lower corner region of said inner surface of said glass window panel and a second light source adhesively attached at a second lower corner region of said inner surface of said glass window panel;

wherein said electrically conductive traces comprise first, second, third and fourth electrically conductive traces;

wherein said electrical connectors comprise a positive electrical connector and a negative electrical connector;

wherein said first electrically conductive trace is established at and along said inner surface of said glass window panel between said positive electrical connector and a positive terminal of said first light source, and wherein said second electrically conductive trace is established at and along said inner surface of said glass window panel between said negative electrical connector and a negative terminal of said first light source, and wherein said third electrically conductive trace is established at and along said inner surface of said glass window panel between said positive electrical connector and a positive terminal of said second light source, and wherein said fourth electrically conductive trace is established at and along said inner surface of said glass window panel between said negative electrical connector and a negative terminal of said second light source;

wherein at least one selected from the group consisting of (i) said first and second light sources are disposed at said opaque non-light-transmitting layer, (ii) said positive and negative electrical connectors are disposed at said opaque non-light-transmitting layer, and (iii) said first, second, third and fourth electrically conductive traces are disposed at said opaque non-light-transmitting layer;

wherein said positive and negative electrical connectors are configured to electrically connect to a power source of the vehicle when said rear liftgate window assembly is mounted at the vehicle; and wherein, with said rear liftgate window assembly mounted at the vehicle and with said positive and negative electrical connectors electrically connected to the power source of the vehicle and when said glass window panel is in its opened position, said first and second light sources are operable to emit light to illuminate a ground area rearward of the vehicle.

17. The rear liftgate window assembly of claim 16, wherein each of said first and second light sources comprises at least one light emitting diode disposed in a housing that is adhesively attached at said inner surface of said glass window panel.

18. The rear liftgate window assembly of claim 16, wherein, with said glass window panel pivotally mounted at the upper rear portion of the vehicle and with said positive and negative electrical connectors electrically connected to the power source of the vehicle, said first and second light sources are activated responsive to opening of said glass window panel, and wherein said first and second light sources are deactivated when said glass window panel is in its closed position.

19. The rear liftgate window assembly of claim 18, wherein said first and second light sources are activated responsive to a sensor that senses when said glass window panel is pivoted.

20. The rear liftgate window assembly of claim 18, wherein said first and second light sources are activated responsive to a user input.

21. The rear liftgate window assembly of claim 18, wherein said first and second light sources are controlled in part responsive to an ambient light sensor, and wherein said first and second light sources are not activated when said glass window panel is in the opened position and responsive to a signal from said ambient light sensor being indicative of ambient light above a threshold level.

22. The rear liftgate window assembly of claim 16, wherein said positive and negative electrical connectors are disposed at said opaque non-light-transmitting layer, and wherein said first, second, third and fourth electrically conductive traces are established at said opaque non-light-transmitting layer.

23. The rear liftgate window assembly of claim 22, wherein said first and second light sources are adhesively attached at said opaque non-light-transmitting layer.

24. The rear liftgate window assembly of claim 16, wherein said glass window panel comprises a perimeter edge that circumscribes said inner surface and spans between said inner surface and an outer surface of said glass window panel, and wherein, with said glass window panel pivotally mounted at the upper rear portion of the vehicle, said perimeter edge is exposed and viewable when said glass window panel is in the opened position.

* * * * *